United States Patent
Hommen et al.

(10) Patent No.: US 7,168,370 B2
(45) Date of Patent: Jan. 30, 2007

(54) SYSTEM FOR THE SECONDARY SUSPENSION OF A SUPERSTRUCTURE OF A RAIL VEHICLE HAVING AN ACTIVE SPRING ELEMENT

(75) Inventors: Winfried Hommen, Ebersberg (DE); Henry Kirsch, München (DE); Martin Lehmair, München (DE); Reinhard Loebner, München (DE); Martin Waldstein, München (DE); Ralf Oberthür, München (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 11/015,801

(22) Filed: Dec. 20, 2004

(65) Prior Publication Data

US 2005/0204951 A1    Sep. 22, 2005

(30) Foreign Application Priority Data

Dec. 22, 2003   (DE) .............................. 103 60 517

(51) Int. Cl.
*B61F 1/00* (2006.01)
(52) U.S. Cl. .................................... 105/453
(58) Field of Classification Search ................. 105/453, 105/199.1, 199.2, 199.3; 180/41; 280/5.5, 280/5
See application file for complete search history.

(56) References Cited

U.S. PATENT DOCUMENTS

| 2,917,321 A | 12/1959 | Fennell |
| 3,396,674 A | 8/1968 | Tani |
| 3,491,702 A | 1/1970 | Dean |
| 3,524,657 A | 8/1970 | Yew et al. |
| 4,097,063 A | 6/1978 | Dean |
| 4,368,672 A | 1/1983 | Germer |
| 4,428,302 A | 1/1984 | Herring, Jr. |
| 4,468,050 A | 8/1984 | Woods et al. |
| 5,193,849 A | 3/1993 | Holzmann |

(Continued)

FOREIGN PATENT DOCUMENTS

AT    373 847    7/1983

(Continued)

*Primary Examiner*—S. Joseph Morano
*Assistant Examiner*—Robert J. McCarry, Jr.
(74) *Attorney, Agent, or Firm*—Barnes & Thornburg LLP

(57) ABSTRACT

System for the secondary suspension of a superstructure (1) of a rail vehicle, having a hydropneumatic spring unit (3), with an assigned suspension accumulator (7) as an active spring element, placed between the superstructure (1) and a bogie (2) arranged below it, which active spring element ensures at least one raised travelling level ($N_F$) for the superstructure during the travel of the rail vehicle, in which case, by way of the hydropneumatic spring unit (3), by means of a level control, in addition to the raised travelling level ($N_F$), a lowered station platform level ($N_B$) for the superstructure (1) can also be adjusted, the suspension accumulator (7) being blockable when the rail vehicle is stopped in order to relieve the level control during a change of load, and in that, for an emergency operation caused by a pressure drop, additionally at least one emergency spring cylinder (18) is provided which, in the event of a pressure failure, by means of an independent moving-out, ensures an emergency spring level ($N_N$) situated between the station platform level ($N_B$) and the travelling level ($N_F$).

19 Claims, 2 Drawing Sheets

U.S. PATENT DOCUMENTS

Figure 1:
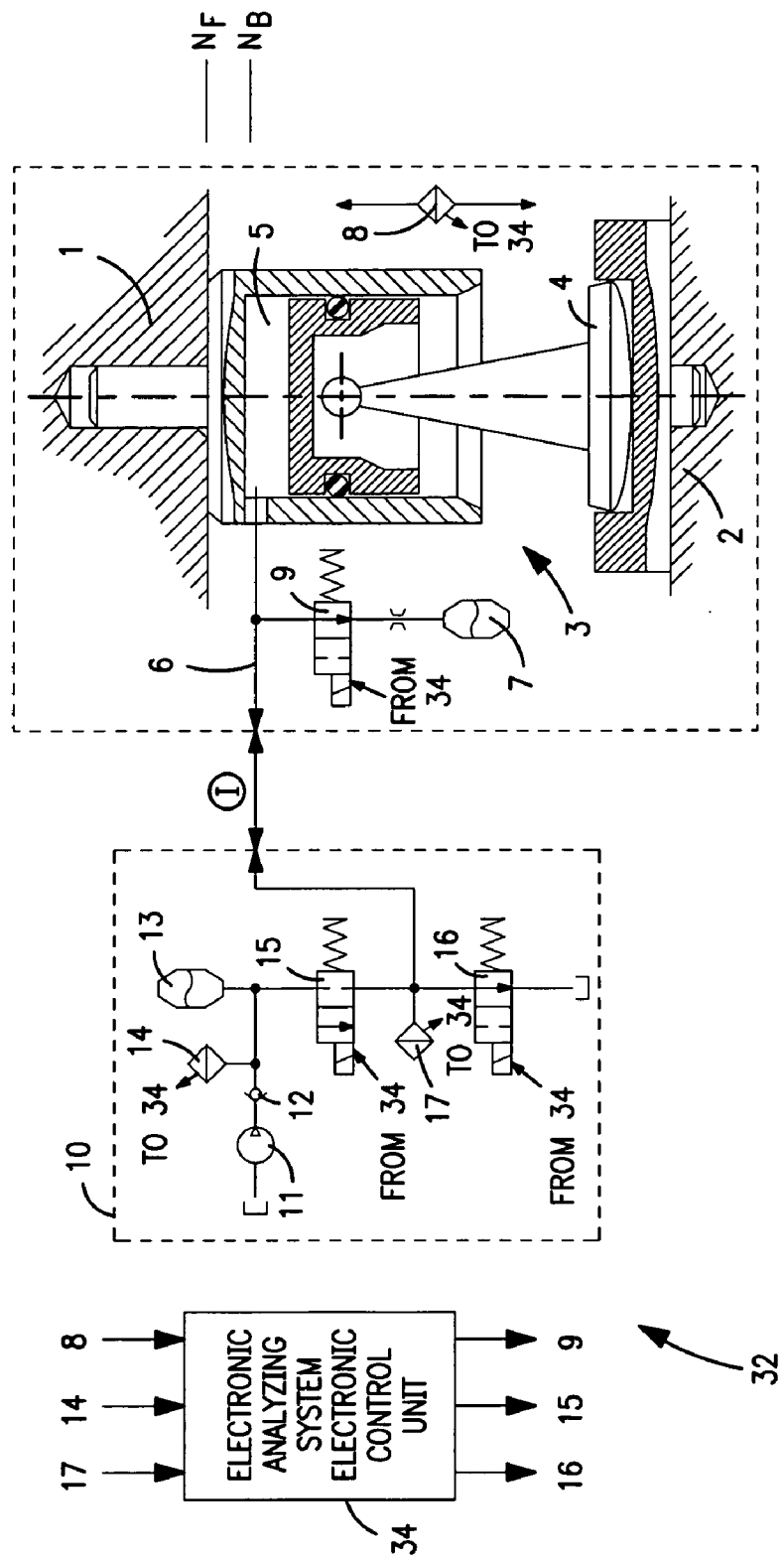

| | | |
|---|---|---|
| 5,443,282 A | 8/1995 | Gipser |
| 5,573,266 A | 11/1996 | Zalewski et al. |
| 5,588,368 A | 12/1996 | Richter et al. |
| 5,671,682 A | 9/1997 | Hölzl et al. |
| 5,700,026 A | 12/1997 | Zalewski et al. |
| 5,769,400 A | 6/1998 | Hölzl et al. |
| 5,947,031 A | 9/1999 | Polley |
| 5,988,655 A | 11/1999 | Sakai et al. |
| 6,098,995 A | 8/2000 | Danis |
| 6,102,378 A | 8/2000 | Gieseler et al. |
| 6,249,728 B1 | 6/2001 | Streiter |
| 6,273,002 B1 | 8/2001 | Hachmann et al. |
| 6,550,394 B1 * | 4/2003 | Polley .................. 105/164 |
| 6,623,016 B2 * | 9/2003 | Sulzyc et al. ............ 280/5.514 |
| 6,637,348 B1 * | 10/2003 | Teichmann et al. ......... 105/453 |
| 6,684,139 B1 | 1/2004 | Kirat et al. |
| 2002/0096840 A1 | 7/2002 | Sulzyc et al. |

FOREIGN PATENT DOCUMENTS

| | | |
|---|---|---|
| DE | 1 947 680 | 1/1971 |
| DE | 27 23 305 | 12/1978 |
| DE | 38 34 693 A1 | 6/1989 |
| DE | 40 13 673 A1 | 10/1991 |
| DE | 195 15 255 A1 | 10/1996 |
| EP | 0 663 877 B1 | 7/1995 |
| EP | 0 690 802 B1 | 1/1996 |
| FR | 2 436 682 | 9/1978 |
| WO | WO 94/03340 A1 | 2/1994 |

* cited by examiner

SYSTEM FOR THE SECONDARY SUSPENSION OF A SUPERSTRUCTURE OF A RAIL VEHICLE HAVING AN ACTIVE SPRING ELEMENT

The present invention relates to a system for the secondary suspension of a superstructure of a rail vehicle, having a hydropneumatic spring unit, with an assigned suspension accumulator as an active spring element, placed between the superstructure and a bogie arranged below it, which active spring element ensures at least one raised travelling level ($N_F$) for the superstructure during the travel of the rail vehicle.

Such a secondary suspension of the superstructure of a rail vehicle is used for increasing the comfort when conveying passengers. A rail vehicle normally also has a primary suspension. The primary suspension acts between the wheel axles of the rail vehicle and the bogie and is used predominantly for absorbing hard shocks to which the rail vehicle is subjected during its travel as a result of an uneven rail guidance and the like. In contrast, a secondary suspension between a superstructure and railborne bogie of a rail vehicle is used particularly for the additional vibration isolation of the superstructure in order to permit a particularly comfortable travel by means of the rail vehicle when conveying passengers. In many cases, the secondary suspension also interacts with a roll control for the superstructure.

From European Patent Document EP 0 690 802 B1, a secondary suspension for a rail vehicle is known which is constructed in the manner of a hydropneumatic suspension. The secondary suspension is achieved by means of a hydraulic cylinder whose pressure chamber is connected with a hydropneumatic pressure accumulator. By way of the gas volume of the hydropneumatic pressure accumulator, a vertical spring effect is achieved. Furthermore, the hydraulic cylinder is equipped with a pendulum support which forms a part of the piston rod having a joint at the upper end. During transverse movements, the pendulum support swings out, its end rolling on a corresponding surface. Since the radius of the end surface of the pendulum support is larger than the distance of the joint from its supporting surface, a restoring moment takes place during transverse movements which, as a result of the constant distance of the joint from the supporting surface, is independent of the spring excursion.

It is generally known to use conventional steel springs for the secondary suspension in the simplest case, in addition to a pneumatic suspension or a hydropneumatic suspension. The superstructure is normally cushioned with respect to the bogie by way of two such passive spring elements, in which case the bogie normally carries a pair of wheel axles which establish the contact with the rail.

However, when a secondary suspension is constructed by means of steel springs as passive spring elements, the problem arises that the superstructure level may change as a function of the loading. In the sense of the present patent application, the superstructure level is the vertical level of the superstructure relative to the bogie or to the ground.

From European Patent Document EP 0 663 877 B1, a system for the secondary suspension is known which avoids this problem in that no steel springs are used for the secondary suspension, but the secondary suspension is implemented by way of a hydropneumatic spring unit. As in the initially prior art, the hydropneumatic spring unit consists of a spring leg and of a hydropneumatic pressure accumulator. These assemblies carry out the function of cushioning the superstructure as well as the function of damping the spring excursions. The spring leg is fastened on the superstructure and on the bogie. During a spring excursion, the piston in the spring leg displaces a defined oil volume. In the hydropneumatic pressure accumulator connected with the spring leg, this oil volume acts against a gas cushion which is separated from the oil volume by a membrane and is therefore used as a springy element. The hydraulic fluid as the liquid column therefore takes over the function of the power transmission. The vehicle vibrations during the travel are damped by means of the nozzles housed in a nozzle block. As the load of the superstructure increases, the gas volume in the hydropneumatic accumulators is compressed. Without any level control system, this would result in a lowering of the superstructure, as in the case of the above-described passive spring element. However, in order to avoid this lowering, the reduction of the gas volume has to be compensated by feeding a corresponding amount of hydraulic fluid. For this purpose, the level control system is provided which carries out this compensation as a function of the distance between the superstructure and the bogie measured by means of a level sensor. The controlling of level changes takes place continuously and with little time delay while the vehicle is stopped. During the travel, the mean vehicle level is also continuously monitored and compensated.

In certain application cases, it is defined that, in addition to a raised travelling level $N_F$, the superstructure also has to take up a station platform level $N_B$ level which is below it and which, in a lowered position of the superstructure, matches the door steps of the rail vehicles with the height of the station platform, so that an entering and exiting becomes possible without steps.

Here, the problem arises that, during the entering and exiting, because of the resulting change of weight of the superstructure, the level control would constantly have to readjusted in order to obtain such a station platform level $N_B$. Thus, a reduction of the weight of the superstructure takes place during the exiting. As a result, the gas contained in the suspension accumulator expands and displaces the hydraulic fluid into the hydropneumatic spring unit. The resulting raising of the superstructure is counteracted by the level control by a corresponding opening of the tank-side level control valve. In contrast, the weight of the superstructure increases during the entering, which leads to the compressing of the gas in the suspension accumulator. The opening of a feeding-pressure-side level control valve counteracts the resulting lowering of the superstructure. This constant readjustment for maintaining the station platform level $N_B$ for the entering and exiting would lead to disturbing jolting movements of the level-controlled superstructure.

From German Patent Document DE 195 15 255 A1, a level control device for vehicles is known which acts between the vehicle axles and the vehicle body. Here, the basis of the level control is the influencing of a pure pneumatic suspension of the vehicle body. During the stopping time at a station stop, the vehicle body is lowered by corresponding control-related measures. The level control is deactivated during the stopping time.

According to German Patent Document DE 38 34 693 A1, a similar deactivation can take place in the case of a hydropneumatic spring unit by blocking the connection between the hydraulic cylinder and the hydraulic accumulator by means of a valve. With respect to the use disclosed here, an unfavorable position change at the vehicle is avoided by means of this measure depending on the shovel load of a tractor which can be used in agriculture or in the construction industry.

However, it is a disadvantage of this blocking solution for maintaining a taken-up vehicle level that the entire functionality fails in the event of a disturbance of the level control or of the valve control. Suitable measures for an emergency operation resulting therefrom are completely absent.

It is therefore an object of the present invention to create a system for the secondary suspension by means of which, despite a level-controlled superstructure, a comfortable entering and exiting is ensured at a station platform level $N_B$, in which case measures for an emergency operation should also be provided.

Based on a system according to the preamble of claim 1, this object is achieved in conjunction with its characterizing features. The independent claims, which follow, reflect advantageous further developments of the invention.

The invention includes the technical teaching that, by way of the hydropneumatic spring unit, by means of the level control, in addition to the raised travelling level $N_F$, a lowered station platform level $N_B$ for the superstructure can also be adjusted, in which case, however, when the rail vehicle is stopped, the suspension accumulator is blocked. When the rail vehicle is stopped, it preferably is at the lowered station platform level ($N_B$).

It is an advantage of the solution according to the invention that, as a result of the uncoupling of the hydropneumatic spring unit achieved hereby from the suspension accumulator implementing the suspension, a compression or expansion of the gas contained in the suspension accumulator during the entering and exiting of persons into and out of the superstructure is prevented. As soon as the rail vehicle has stopped at the station platform and, as a result of the level control, the superstructure is at the station platform level $N_B$, the suspension accumulator is blocked at the hydropneumatic spring unit. The two constructional units are now uncoupled. When persons exit from the superstructure, the pressure within the hydropneumatic spring unit is reduced but the level remains constant because of the lower compressibility of the hydraulic fluid when the level control valves are closed. Thus, no controller activity or only a minimal controller activity is caused during the exiting, so that unnecessary energy consumption is avoided.

For controlling down (blocking? translator) the spring accumulator cylinder from the hydropneumatic spring unit, a shut-off valve is preferably used which can be constructed in the manner of a solenoid 2/2-way valve and is placed locally between the suspension accumulator and a working pipe acting upon the hydropneumatic spring unit. Concretely, the shut-off valve can be arranged at a branch of this working line toward the suspension accumulator.

Another measure improving the invention consists of the fact that, for an emergency operation of the system according to the invention caused by a pressure failure, additionally at least one emergency spring cylinder is provided which, when the system fails, by means of an independent moving-out, ensures of (?) (ensures an? translator) an emergency spring level $N_N$ situated between the station platform level $N_B$ and the travelling level $N_F$. The emergency spring cylinder can be constructed as a hydraulic tension cylinder whose piston can move out by means of a pressure spring, preferably a coil spring made of steel. With respect to the flow of force, the emergency spring cylinder can be connected either parallel or in series with respect to the hydropneumatic spring unit. By means of a series connection, a particularly space-saving arrangement is achieved between the bogie and the superstructure, whereas a parallel connection ensures a good access to the emergency spring cylinder as well as to the hydropneumatic spring unit.

In the case of the object of the invention, preferably two hydraulic circuits I as well as II are provided, hydraulic circuit I supplying the hydropneumatic spring unit and hydraulic circuit II supplying the emergency spring cylinder exclusively with pressure medium. However, it is also conceivable that the hydropneumatic spring unit as well as the emergency spring cylinder be fed by only one hydraulic circuit.

The system according to the invention is suitable for the integration of a pendulum support—known per se—in order to transmit also transverse movements between the superstructure and the bogie. To this extent, the pendulum support forms a part of the hydropneumatic spring unit.

For measuring the distance between the superstructure and the bogie, a level sensor of the type of a distance sensor can be used within the scope of the level control. In this case, the level sensor can simultaneously also be used for activating the emergency spring cylinder. As an alternative, it is also conceivable to integrate a pressure sensor into the corresponding at least one hydraulic circuit I. The electronic analyzing system on the output side of this pressure sensor activates the zero spring cylinder in the event of a drop of the pressure below a lower limit value.

Additional measures improving the invention will be indicated in detail in the following together with a description of a preferred embodiment of the invention by means of the figures.

Figure 2:
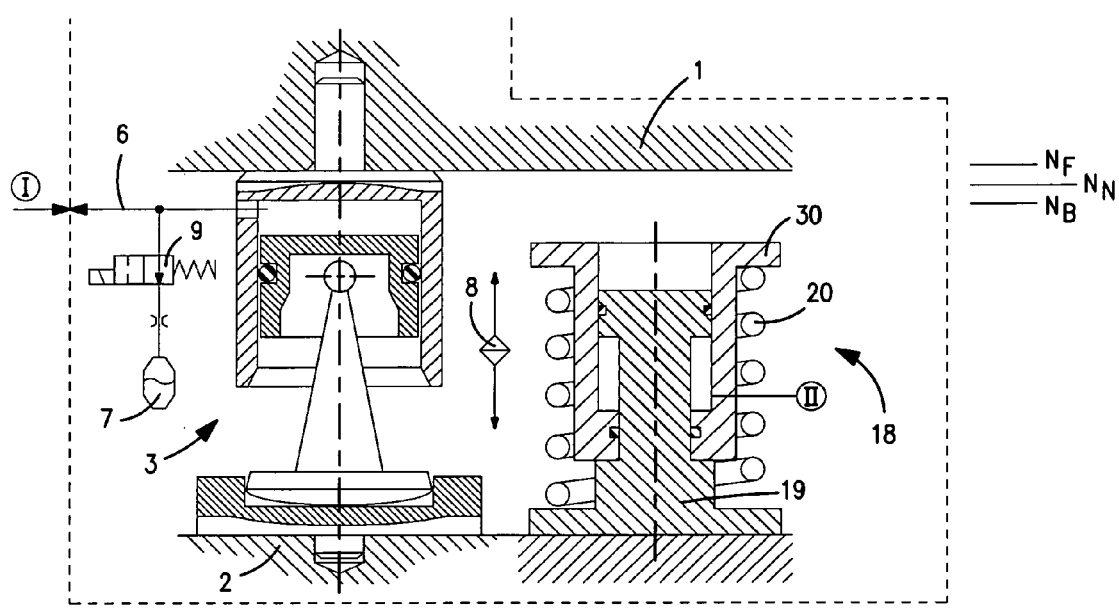

FIG. 1 is a schematic view of a system for the secondary suspension of a superstructure with a hydropneumatic spring unit and a blockable suspension accumulator; and FIG. 2 is a schematic sectional view of the hydropneumatic spring unit according to FIG. 1 supplemented by an emergency spring cylinder arranged beside it for an emergency operation.

According to the FIG. 1, a hydropneumatic spring unit 3 is arranged as an active spring element between an upper superstructure 1 of a rail vehicle—not shown in detail—and a lower bogie 2. During the travel of the rail vehicle, the hydropneumatic spring unit 3 ensures a raised travelling level $N_F$ for the superstructure 1, so that the latter remains largely unaffected by disturbing vibrations caused during the travel. By way of a lower pendulum support 4, the hydropneumatic spring unit 3 simultaneously takes over a transverse guidance of the superstructure 1. A pressure chamber 5 within the hydropneumatic spring unit 3 is acted upon by way of a hydraulic circuit I, specifically by way of a working line 6. By way of a branching within the working line 6, a suspension accumulator 7 is connected whose integrated gas volume ensures the spring characteristic of the hydropneumatic spring unit 3. By acting upon the pressure chamber 5, the distance between the superstructure 1 and the bogie 2 can be varied. For controlling this superstructure level, a level sensor 8 of the type of a distance sensor is provided for measuring the distance between the superstructure 1 and the bogie 2. The level sensor 8 operates as an actual-value generator of a level control unit integrated in an electronic control unit—not shown here in detail—for adjusting the desired superstructure level.

In this manner, the superstructure 1 is raised to an upper travelling level NF during the normal travel of the rail vehicle. In this position, the maximal spring travel is ensured for maximal comfort. During the stoppage of the rail vehicle at the station platform, the superstructure 1 is lowered to a lower station platform level $N_B$. At this station platform level $N_B$, persons can comfortably enter the rail vehicle without stepping over a step at the relatively low station platform level.

In order to reduce (and thereby relieve the level control) the energy consumption during the stoppage of the rail vehicle at the station platform (caused? translator) by a constant readjustment of the level control required because of an entering and exiting, the suspension accumulator 7 is controlled down (typing mistake? blocked? translator) at the lowered station platform level $N_B$. This takes place by way of a shut-off valve 9 arranged between the suspension accumulator 7 and the branching of the working line 6. In this embodiment, the shut-off valve 9 is constructed as a spring-restored solenoid 2/2-way valve. An operation of the shut-off valve 9 uncouples the gas volume contained in the suspension accumulator 7 from the hydraulic fluid inside the pressure chamber 5, so that a further movement of the superstructure 1 as a result of the relatively rigid liquid column does not take place.

The hydraulic circuit I is fed by a hydraulic pump 11 housed in a hydraulic unit 10 and is guided by way of a nonreturn valve 12 to a feeding-pressure-side hydraulic accumulator 13. A pressure sensor 14 provided in this section monitors the feeding-pressure side pressure and, to this extent, also reports a pressure failure. Depending on the adjusting value, the level control system controls either a feeding-pressure-side filling valve 15 or a tank-side drain valve 16 in order to, by way of the working line 6, control the desired pressure in the pressure chamber 5 required for the level to be adjusted. The actual pressure is detected by way of a pressure sensor 17.

According to FIG. 2, an emergency spring cylinder 18 is provided locally beside the hydropneumatic spring unit 3. By way of the emergency spring cylinder 18, an emergency operation of the system according to the invention is implemented. In the event of a pressure failure, the emergency spring cylinder 18, by means of an independent moving-out, ensures an emergency spring level $N_N$ situated between the station platform level $N_B$ and the travelling level $N_F$. The emergency spring cylinder 18 consists of a hydraulic tension cylinder 19 whose movable piston can be moved out by means of a pressure spring 20. The pressure spring 20 is constructed in a manner of a coil spring made of steel and coaxially surrounds the tension cylinder 19. On the whole, the emergency spring cylinder 18 is connected with respect to the flow of force parallel to the hydropneumatic spring unit 3. In this embodiment, the emergency spring cylinder 18 is supplied with pressure medium by its own hydraulic circuit II. When an unacceptable pressure drop is detected in the hydraulic circuit I, or when the pressure drops in the hydraulic circuit II, the movable piston of the tension cylinder 19, as a result of the spring effect of the pressure spring 20, arrives in the moved-out position in order to take over the suspension of the superstructure I in the sense of an emergency suspension.

In its construction, the present invention is not only limited to the above-described concrete embodiment. On the contrary, modifications of this embodiment are also conceivable which utilize the teaching of the claims which follow. Thus, it is also conceivable to feed the hydropneumatic spring unit and the emergency spring cylinder by way of a single hydraulic circuit, in which case the valve wiring should be adapted correspondingly. Likewise, the emergency spring cylinder can also be constructed differently than suggested above, as long as its defined function is maintained.

LIST OF REFERENCE NUMBERS

1 Superstructure
2 bogie
3 hydropneumatic spring unit
4 pendulum support
5 pressure chamber
6 working line
7 suspension accumulator
8 level sensor
9 shut-off valve
10 hydraulic unit
11 hydraulic pump
12 nonreturn valve
13 hydraulic accumulator
14 pressure sensor
15 filling valve
16 drain valve
17 pressure sensor
18 emergency spring cylinder
19 tension cylinder
20 pressure spring

The invention claimed is:

1. A secondary suspension system for a rail vehicle comprising:
    a superstructure;
    a bogie arranged below the superstructure;
    a level control to control levels of the superstructure;
    a hydropneumatic spring unit, located between the superstructure and the bogie, the hydropneumatic spring unit ensuring at least one raised travelling level for the superstructure during travel of the rail vehicle and being adjustable to provide a lowered station platform level;
    a suspension accumulator assigned to the hydropneumatic spring unit, the suspension accumulator being blockable by the level control when the vehicle is stopped to prevent a change of level of the rail vehicle during a change of loading of the rail vehicle; and
    further including at least one emergency spring cylinder which, in an emergency operation caused by at least one of the following a) a pressure drop and b) a pressure failure, a moving out of the emergency spring cylinder ensures an emergency spring level between the lowered station platform level and the at least one travelling level.

2. The system according to claim 1, wherein, when the rail vehicle is stopped, the rail vehicle is at the lowered station platform level.

3. The system according to claim 1, wherein to block the suspension accumulator, a shut-off valve is provided between the suspension accumulator and a working line connected to the hydropneumatic spring unit.

4. The system according to claim 1, wherein the at least one emergency spring cylinder includes a hydraulic tension cylinder having a movable piston configured to be moved out by a pressure spring.

5. The system according to claim 4, wherein the pressure spring is configured as a coil spring coaxially surrounding the tension cylinder.

6. The system according to claim 1, wherein the at least one emergency spring cylinder is connected to the hydropneumatic spring unit in one of the following a) in parallel and b) in series with respect to a flow of force.

7. The system according to claim 1, further including first and second hydraulic circuits, the first hydraulic circuit supplying the hydropneumatic spring unit with pressure medium and the second hydraulic circuit supplying the emergency spring cylinder with pressure medium.

8. The system according to claim 1, wherein the hydropneumatic spring unit includes a pendulum support to transmit transverse movements between the superstructure and the bogie.

9. The system according to claim 1, further including a level sensor to measure a distance between superstructure and the bogie, the level sensor being a component of the level control for adjusting a desired superstructure level.

10. The system according to claim 9, wherein the level sensor is simultaneously also used for activating the at least one emergency spring cylinder.

11. The system according to claim 7, further including a pressure sensor in the first hydraulic circuit and an electronic analyzing system is connected on an output side of the pressure sensor, wherein in the event of a pressure drop below a lower limit value, the at least one emergency spring cylinder is activated.

12. The system of claim 1, wherein the hydropneumatic spring unit is an active spring element.

13. The system of claim 3, wherein the shut-off valve is a spring-restored solenoid valve.

14. The system of claim 5, wherein the coil spring is made of steel.

15. The system of claim 9, wherein the level sensor is an actual-value generator.

16. A secondary suspension system for a rail vehicle comprising:
a superstructure;
a bogie arranged below the superstructure;
a level control to control levels of the superstructure;
a hydropneumatic spring unit, located between the superstructure and the bogie, the hydropneumatic spring unit ensuring at least one raised travelling level for the superstructure during travel of the rail vehicle and being adjustable to provide a lowered station platform level;
a suspension accumulator assigned to the hydropneumatic spring unit, the suspension accumulator being blockable when the rail vehicle is stopped in order to relieve the level control during a change of loading of the rail vehicle;
further including at least one emergency spring cylinder which, in an emergency operation caused by at least one of the following a) a pressure drop and b) a pressure failure, a moving out of the emergency spring cylinder ensures an emergency spring level between the lowered station platform level and the at least one travelling level;
wherein the at least one emergency spring cylinder includes a hydraulic tension cylinder having a movable piston configured to be moved out by a pressure spring; and
wherein the pressure spring is configured as a coil spring coaxially surrounding the tension cylinder.

17. A secondary suspension system for a rail vehicle comprising:
a superstructure;
a bogie arranged below the superstructure;
a level control to control levels of the superstructure;
a hydropneumatic spring unit, located between the superstructure and the bogie, the hydropneumatic spring unit ensuring at least one raised travelling level for the superstructure during travel of the rail vehicle and being adjustable to provide a lowered station platform level;
a suspension accumulator assigned to the hydropneumatic spring unit, the suspension accumulator being blockable when the rail vehicle is stopped in order to relieve the level control during a change of loading of the rail vehicle; further including at least one emergency spring cylinder which, in an emergency operation caused by at least one of the following a) a pressure drop and b) a pressure failure, a moving out of the emergency spring cylinder ensures an emergency spring level between the lowered station platform level and the at least one travelling level; and
wherein the hydropneumatic spring unit includes a pendulum support to transmit transverse movements between the superstructure and the bogie.

18. A secondary suspension system for a rail vehicle comprising:
a superstructure;
a bogie arranged below the superstructure;
a level control to control levels of the superstructure;
a hydropneumatic spring unit, located between the superstructure and the bogie, the hydropneumatic spring unit ensuring at least one raised travelling level for the superstructure during travel of the rail vehicle and being adjustable to provide a lowered station platform level;
a suspension accumulator assigned to the hydropneumatic spring unit, the suspension accumulator being blockable when the rail vehicle is stopped in order to relieve the level control during a change of loading of the rail vehicle;
further including at least one emergency spring cylinder which, in an emergency operation caused by at least one of the following a) a pressure drop and b) a pressure failure, a moving out of the emergency spring cylinder ensures an emergency spring level between the lowered station platform level and the at least one travelling level; and
further including a level sensor to measure a distance between superstructure and the bogie, the level sensor being a component of the level control for adjusting a desired superstructure level.

19. A secondary suspension system for a rail vehicle comprising:
a superstructure;
a bogie arranged below the superstructure;
a level control to control levels of the superstructure;
a hydropneumatic spring unit, located between the superstructure and the bogie, the hydropneumatic spring unit ensuring at least one raised travelling level for the superstructure during travel of the rail vehicle and being adjustable to provide a lowered station platform level;
a suspension accumulator assigned to the hydropneumatic spring unit, the suspension accumulator being blockable when the rail vehicle is stopped in order to relieve the level control during a change of loading of the rail vehicle;
further including at least one emergency spring cylinder which, in an emergency operation caused by at least one of the following a) a pressure drop and b) a pressure failure, a moving out of the emergency spring cylinder ensures an emergency spring level between the lowered station platform level and the at least one travelling level;
further including first and second hydraulic circuits, the first hydraulic circuit supplying the hydropneumatic spring unit with pressure medium and the second hydraulic circuit supplying the emergency spring cylinder with pressure medium; and further including a pressure sensor in the first hydraulic circuit and an electronic analyzing system is connected on an output side of the pressure sensor, wherein in the event of a pressure drop below a lower limit value, the at least one emergency spring cylinder is activated.

* * * * *